United States Patent [19]
Chapin et al.

[11] Patent Number: 5,812,256
[45] Date of Patent: Sep. 22, 1998

[54] VISION SYSTEM FOR WHEEL ALIGNMENT

[75] Inventors: Thomas Chapin; M. Stanley Merrill, both of Englewood, Colo.

[73] Assignee: Merilab, Inc., Englewood, Colo.

[21] Appl. No.: 700,766

[22] Filed: Aug. 13, 1996

[51] Int. Cl.$^6$ .................................................. G01B 11/275
[52] U.S. Cl. ...................................... 356/139.09; 356/155
[58] Field of Search ........................... 33/203.12, 203.15, 33/203.16, 203.17; 356/139.09, 376, 155; 348/135, 161

[56] References Cited

U.S. PATENT DOCUMENTS

4,381,548  4/1983  Grossman et al. ................... 356/155 X
5,268,731  12/1993 Fuchiwaki et al. .............. 33/203.12 X

*Primary Examiner*—George M. Dorbroske
*Assistant Examiner*—Joseph L. Felber
*Attorney, Agent, or Firm*—Davis, Graham & Stubbs LLP

[57] ABSTRACT

A moving vision sensor scans the image of an object by moving the transducer to create a topographic image map of the object in three dimensions. In a preferred embodiment, the vision sensors are disposed in a preset camber, caster, toe wheel alignment station within a vehicle assembly line. A first moving vision sensor maps the plane of the wheel in space for toe and camber audit and adjustment. A second moving vision sensor maps the axis of the king pin ball joint in space for caster audit and adjustment.

1 Claim, 6 Drawing Sheets

VISION SYSTEM FOR WHEEL ALIGNMENT

FIELD OF THE INVENTION

This invention relates to a method and apparatus for measuring chassis geometry, and more particularly to a preset station which rapidly and accurately audits the chassis geometry by topographically mapping the location, shape or volume of relevant chassis reference points, areas and volumes. The invention has particular utility for real time auditing vehicle production lines.

BACKGROUND OF THE INVENTION

Correct vehicle suspension and geometry improve the directional stability, tracking, cornering, and the overall "drivability" and handling of a vehicle while also increasing tire tread life and wear. As used in this specification, "chassis geometry" refers to the entire set of physical specifications, including wheel alignment, toe, camber, caster, ride height and other factors related to the vehicle's geometry, and an audit of chassis geometry refers to the measurement of one or more chassis geometry references of an actual production vehicle and comparing the results of those measurements against the corresponding chassis geometry specifications.

Wheel alignment is an important aspect of overall vehicle suspension and chassis geometry. Wheel misalignment has typically been one of the leading defects of newly assembled vehicles and has been, as a result, one of the biggest after-sale warranty make up items. Vehicle manufacturers continue to seek an assembly line solution for auditing and adjusting vehicle wheel alignment before the vehicle is delivered to a customer.

Measurements of toe, camber, caster and other points of reference on a vehicle's frame and chassis can audit the vehicle suspension and chassis geometry on an assembly line. The process of taking such measurements is complicated by a number of factors, including ease of access.

A measuring tool or probe can be made to touch the point(s) being measured, which results in a so-called "contact" or direct, physical measurement. Alternatively, a non-contact sensor may be used, which results in a "non-contact" measurement. The choice between the two methods is determined by cost, ease of access and/or view, and product variability (that is, the differences in the vehicles which will come down the assembly line).

A contact system will use a probe which touches the point(s) being measured. When the point is moving, as in the case of a point on the wheel which is rotating about an axle, various approaches have been tried, including measurement of tire force on moving cylinders under the tread of the tire itself.

Examples of contact systems include those shown in U.S. Pat. No. 4,856,199 of Merrill et al. (commonly owned by the assignee of the present invention) which uses a probe that is maintained at the same contact point on a tire relative to the wheel during the rotation of the wheel; and U.S. Pat. No. 5,150,515 of Merrill et al. (commonly owned by the assignee of the present invention) which uses both a pair of floating contact rollers to touch the sidewall of tire, and also uses a number of moving cylinders under the tread of the tire itself, thereby measuring both the plane of the rotating wheel and also tire forces for rapidly auditing toe and camber in relation to lateral tire forces.

In contrast to the contact systems, a non-contact system will use vision or other technologies (including air, acoustic, or other non-contact media) to take readings on the point(s) being measured without touching. A typical non-contact "vision" system combines a light source and a camera in a single fixed station in which the light source and the camera fields of vision intersect at a target spot or line (depending upon the characteristics of the light source).

Because the typical vision station's field of vision is fixed, the measurement of multiple target points will require either that the target be moved relative to the fixed station for successive readings (for example, a station's field of vision can be aimed at a line or spot on the sidewall of a tire, and the tire can be rotated on its axle so as successively to rotate additional spots on the sidewall through the field of vision), or else that multiple stations be used to locate two (or more) points or lines on the target (for example, two stations could each locate a point spot on a target, defining a line; three stations could each locate a point spot on a target, defining a plane). Calculations may then be performed to attempt to smooth the readings, to correct for "wobble" in a moving target, to correct for irregularities in the target, and otherwise to return a useful set of data.

In any case, each single vision station, and each vision station in a set of multiple vision stations generally will be absolutely fixed. In fact, in most conventional systems, each single station must be completely stationary in order properly to locate the target and/or properly to calibrate the readings from multiple stations. The target must, likewise, be in a fixed or known position relative to the vision stations so that the independent readings will properly correlate. Where the target is a rotating wheel, the target moves (as it spins), but the vision stations will be absolutely immobile while the measurement is being taken.

Examples of non-contact systems include the vision systems shown in U.S. Pat. Nos. 4,745,469 and 4,899,218 of Waldecker et al. which use non-contact sensors to project structured light onto a vehicle tire while the wheel is being rotated. Likewise, U.S. Pat. No. 5,018,853 of Hechel et al. shows a vision system which uses a light source and a linear charge coupled device (CCD) to measure angles.

In either a contact or a non-contact system, there are problems in finding a predetermined target when the production line and the vehicle chassis may not provide ease of access (for a contact measurement) or ease of view (for a non-contact measurement). In all cases, the audit of any assembly or any component of overall chassis geometry should take place when the assembly which is being measured is under a loading comparable to that which will be experienced under actual driving conditions so as to take the measurements under proper ride height geometry. Finally, a complete preset audit system should be flexible enough to take account of the variability in the vehicles which will be encountered on the assembly line. Precise repeatability and ease of use for the operator are also highly desirable.

Current contact systems, though often more economical than non-contact systems, tend to lack both the desirable speed and flexibility which original equipment manufacturers are seeking. It is time consuming to place the probes at the appropriate contact points and/or it is difficult to account for variations.

Conventional non-contact systems tend to be more expensive than contact systems and also have drawbacks of their own. Assuming that the appropriate chassis areas or reference points can be seen, the requirement that there be a single fixed non-contact station with the target moving relative to it, or a set of multiple fixed non-contact stations to view more than a single target within the same area tends to eliminate flexibility and to introduce a very precise set of tolerances concerning the time and place at which the audit must be taken—it must be known where the vehicle is in relation to one or more vision systems, and this introduces yet another set of potential errors into the audit process itself (beyond the errors already inherent in the measurements being taken). Once calibrated and adjusted, such a system is not immediately reconfigurable to accept great variation in the vehicles being audited.

The present invention transforms the conventional chassis geometry measuring and audit systems. It is a feature of the present system to audit chassis geometry by topographically mapping (or "painting") the three-dimensional shape of the chassis, or of any particular assembly, area, or reference being audited in three dimensional space. Surprisingly, it has been found that the technique of surface volume mapping is fast, economical, flexible, and lends itself very well to integration on an assembly line in a preset chassis audit system.

In the present invention, as embodied in a non-contact vision system, several features combine to provide the desired speed, economy and flexibility. The present invention replaces the typical set of multiple, fixed vision stations which are aimed at two or more points or lines within the same target (or the typical single fixed station in which the target is moved through the fixed field of vision to present a number of points for measurement) with one or more moving vision stations that "paint" the target. That is, the present system translates the vision station itself so that the moving vision station paints the target.

In the present invention, one or more vision stations are set so as to translate a vision field across the surface of the target, thereby scanning the surface. This produces a three-dimensional topographic map or model of the surface area or volume of the target with-out the need for correlating the readings of two or more vision stations. It has been found that this dramatically improves the preset vehicle chassis geometry audit system in which the moving vision station of this invention is included.

Many of the past methods used in the preset area have necessarily slowed the assembly line process because they have involved "hard stops" and "linear measurements." The new method of the present invention as applied to a preset station on an assembly line is highly flexible because it measures the critical suspension and chassis areas and then places them in proper perspective in three dimensional space. This spatial mapping keeps each of the components fixed relative to every other component in the scanned map and means that small variations in tolerance are less disturbing to the system. It also means that the system can be more accommodating, both from the operator's standpoint and from the component's standpoint.

The method of this invention, therefore, treats the suspension, and any other scanned point of chassis geometry, as a self-referenced and complete set of points in space. For example, the ball joints, in accordance with the method of this invention, now have a topographically mapped spatial relationship. As a result, the centerline of the ball joints now represents the true king pin axis, from which camber and caster may be directly measured. This unique concept greatly improves upon prior methods by giving a more direct measurement. Similarly, the chassis itself can be measured (not pushed into place) to provide a true baseline platform upon which to place the suspension components in space. In this manner, the ultimate flexibility is combined with the maximum accuracy.

The remainder of this disclosure will describe the moving vision station, and also the preset vehicle chassis audit system within which the vision station is included. Although the invention will be presented as an integrated whole, it should be understood that certain of the individual components, including the moving vision station as a separate element, the entire preset system including a number of moving vision stations, and the techniques of topographical mapping as applied to audit vehicle chassis geometry have independent value and each component might stand alone and have separate utility apart from the other components and features.

SUMMARY OF THE INVENTION

This invention is a method and apparatus for measuring or auditing vehicle chassis geometry using non-contact stations which topographically map or paint the three-dimensional shape of the chassis, or of any particular assembly, area, or reference being audited in three dimensional space.

In the "background of the invention" it was explained that the chassis geometry includes the entire set of relevant physical specifications. Before proceeding further with the summary of the invention, it may be useful to set forth certain of the specifications or related references which will be frequently addressed. These include toe, camber, caster, and the king pin and king pin spindle.

Toe angle and camber angle are two factors of chassis geometry important to proper vehicle wheel alignment. The king pin, the king pin spindle, and caster angle are important reference factors.

Toe may be defined as the slanting of wheels towards the front or back. A slanting of the wheels towards the front (a slight forward convergence of the wheels) so that they are closer together at the front than at the back is referred to as "toe in" and is indicated by a positive "toe angle" between (a) a horizontal line drawn in the plane of rotation of the wheel through the center of the wheel and parallel to the ground, and (b) a reference line drawn from the front to the back of the vehicle and parallel to the ground. Where the wheels are farther apart at the front than at the back, the condition is "toe out" and is indicated by a negative toe angle.

Camber may be defined as the sloping of the wheels from top to bottom. A sloping of the wheels inwards towards the bottom so that they are closer together at the bottom than at the top results in an outward tilt of the wheel at the top. This is indicated by a positive camber angle between (a) a vertical line drawn in the plane of rotation of the wheel through the center of the wheel, and (b) a reference line drawn perpendicular to the ground. Where the wheels are further apart at the bottom than at the top, the condition is indicated by a negative camber angle.

The king pin is the pin that connects the stub axle to the fixed axle beam of a vehicle and which is tilted from the vertical to allow for caster action (the tilt angle of the king pin from the vertical is sometimes referred to as the caster angle). The king pin spindle coincides with the king pin axis. Various points along the spindle, or at each end thereof, permit the king pin spindle, axis, and caster angle to be determined. For example, the centerline of the ball joints represents the true king pin axis.

This invention involves the concept of scanning the image of an object by moving the transducer to create a topographic image map of the object in three dimensions.

In schematic overview of a wheel alignment application of the method and apparatus of this invention, the preset system of this invention may be incorporated within an existing portion of the vehicle assembly line which has an axle receiving/storage station; pre-dress subassembly station; a pair of stations for semi-automatic C/C/T set and manual torque; and an off-load to carrier station.

At the semi-automatic C/C/T set and manual torque station, a platen elevator raises the platen and subframe. The axle assembly is positioned on the platen upside down to provide convenient access to all adjustment points. The platen initially rests on the conveyer belt for positioning and preloading. The elevator moves toward the platen and, using tapered dowels opposed to mating holes, positively engages the platen (with the subframe carried on the platen). The elevator then lifts the platen and subframe to the operator's working level. At working level, a suspension preloading device loads the suspension to duplicate its correct ride height. Vision sensor cameras then scan selected points on the subframe and display the data on a monitor to the operator, and the operator makes the necessary adjustments as the cameras continue to display the data.

In a preferred embodiment, the vision sensors are disposed in the station so that a first vision sensor scans the toe/camber of a wheel by scanning the outside surface of the wheel (seeing the plane of the wheel in space); and a second vision sensor scans the caster by scanning to the inside of the wheel (seeing the axis of the king pin ball joint). Because the axle assembly subframe carried on the platen has both a left and right wheel, another set of vision sensors will scan the other wheel while the subframe is at the station.

Each of the vision sensors is mounted in a unit which contains a camera and a laser, with their fields of vision triangulated. The laser and the angled camera see objects within the resulting field of view. The laser beam is flat and places a line of light into the field of view which will intersect with any object within the field of view. The camera records the cross sectional line of intersection of the laser beam and the object in the field of view.

The camera/laser transducer is moved as a unit. In a preferred embodiment, the laser beam is flat and is oriented in a horizontal plane. The unit is first translated vertically, then translated a step to the side, and then translated vertically again. The camera is pulsed as the sensor unit translates vertically, and a series of cross sections are obtained which "paint" the object within the field of view.

When the target within the field of view is a wheel, the series of vertical cross sections will, as the sensor unit scans up or down the target and then moves to the side for further vertical scans, topographically map the surface volume, shape or contour of the wheel.

When the target within the field of view is a cylinder or joint, then the high point or centroid between the ends of the image map could be used, individually or collectively to form a topographical map of the axis of the object being scanned. This compilation of the axis from a series of cross sectional lines is useful because it can statistically smooth the shape, providing a composite or averaged reading of the axis much more accurately than could be obtained from only a pair of intersections. Moreover, to set the axis of a cylinder, it would be necessary to have at least two points to describe the line of the axis. Using a conventional, fixed sensor, this would require two stationary units and would present calibration problems. In contrast, using the moving sensor of the present invention, a single sensor gives an accurate reading of the axis because it can scan a number of intersecting lines across the target.

The advantages of the system include speed, accuracy and flexibility in auditing chassis geometry on a preset station on an automobile assembly line. In the more detailed description which follows, the example given will be a preset station for vehicle wheel alignment in a typical vehicle assembly line. It should be constantly understood, however, that the concept of this invention is not narrowly limited to any particular application, and the example is given for purposes of illustration and particular description only.

DETAILED DESCRIPTION OF THE INVENTION

This invention involves the concept of scanning the image of an object by moving the transducer to create a topographic image map of the target in three dimensions.

Figure 1:
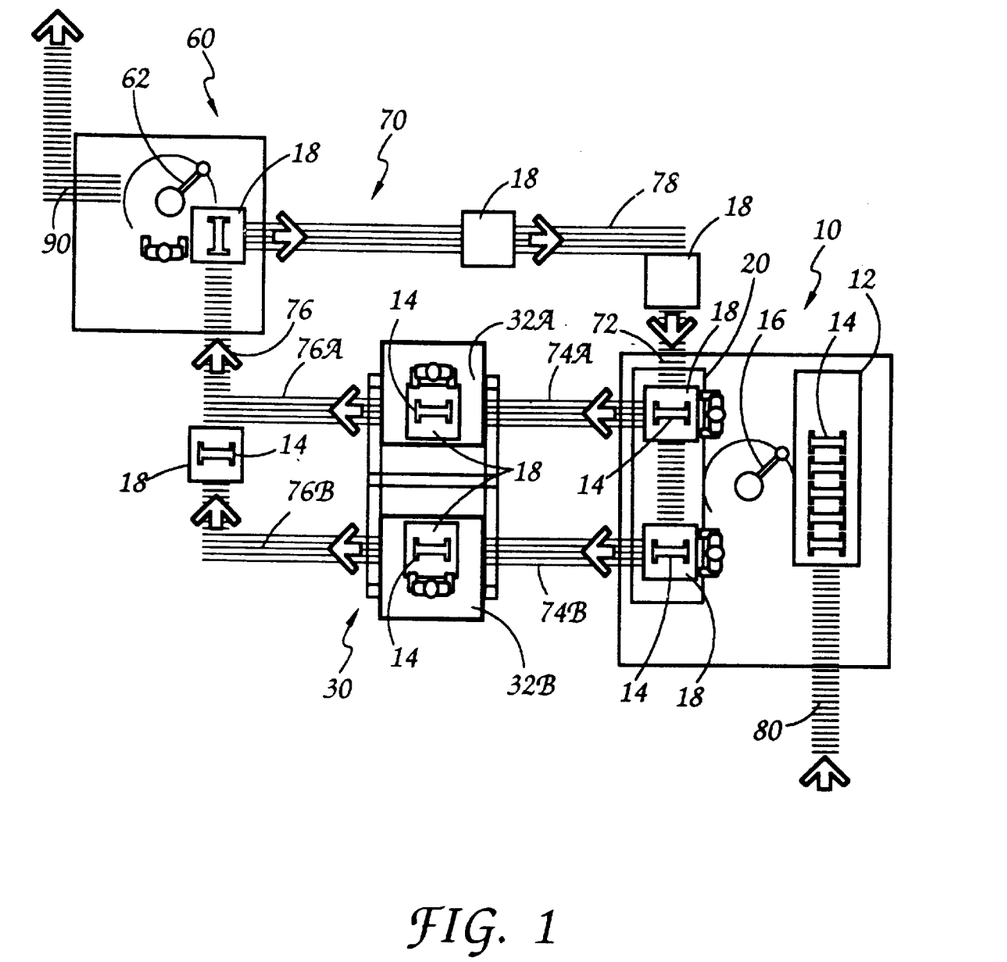
FIG. 1 is a schematic diagram of a preset station for vehicle wheel alignment in accordance with this invention, included in the context of a pre-existing assembly line.

With reference to the schematic diagram of FIG. 1, it may be seen that a preset camber/caster/toe station 30 for vehicle wheel alignment in accordance with this invention may be included in the context of a pre-existing assembly line. With reference to FIG. 1, an assembly line may be seen in overview to include three stations: an axle receiving/storage station (axle station) 10; a semi-automatic camber, caster, and toe set and manual torque station (C/C/T station) 30; and an off-load to carrier station (off-load station) 60. It is within the preset C/C/T station 30 that moving vision sensor units in accordance with this invention are incorporated.

Still in overview and with reference to FIG. 1. it may be seen that the axle station 10 contains a receiving bay 12, a hoist 16, and a pre-dress subassembly bay 20. The C/C/T station 30 includes two parallel audit and adjustment bays (adjustment bays) 32, here separately designated as 32A and 32B. The off-load station 60 includes a hoist 62 for off-loading, and is the end point of this portion of the assembly line.

The three stations just mentioned are in communication with one another by way of a circulating conveyer system 70 which carries a number of platens 18 in a circuit from axle station 10, to C/C/T station 30, to off-load station 60, and back to axle station 10. An incoming conveyer 80 (shown only in part) carries axle subassemblies 14 from elsewhere in the line into receiving bay 12 of axle station 10. An outgoing conveyer 90 (shown only in part) receives axle subassemblies off-loaded from off-load station 60, and returns them to the line.

To follow the path of an axle subassembly 14 through the preset station 30 of this system, it is useful to start at the incoming conveyer 80. An axle subassembly 14 is carried by incoming conveyer 80 to receiving bay 12 of axle station 10. The axle subassembly 14 is loaded by hoist 16 to platen 18 on segment 72 of circulating conveyer 70. Segment 72 of the circulating conveyer passes the axle subassembly 14 to pre-dress subassembly bay 20 of axle station 10.

From pre-dress assembly bay 20 of axle station 10, the circulating conveyer 70 branches from segment 72 and carries axle subassemblies 14 on platens 18 to each of the two adjustment bays 32A and 32B of C/C/T station 30. The corresponding feeder portions of conveyer 70 into the adjustment bays 32A and 32B are indicated by conveyer segments 74A and 74B, respectively.

Exiting from the adjustment bays 32A, 32B of. C/C/T station 30, the axle subassemblies are carried by segments 76A and 76B of circulating conveyer 70 to off-load station 60. Segments 76A and 76B are seen converging at segment 76 of circulating conveyer system 70. From segment 76 of the circulating conveyer, the preset axle subassemblies 14 are carried into off-load station 60, and hoist 62 unloads the axle subassemblies from platens 18 and returns them to the line by way of outgoing conveyer 90. Finally, the platens 18 recirculate back to axle station 10 through segment 78 of circulating conveyer 70 which reenters the axle station at segment 72 of the circulating conveyer system.

Thus it may be readily understood that the entire preset operation conducted at C/C/T station 30 is "off-line." The axle subassemblies 14 are input into the preset system from the line at axle receiving station 10 by way of incoming conveyer 80. After audit and adjustment in one of the adjustment bays 32 at C/C/T station 30, the preset, audited and adjusted axles are returned to the line at off-load station 60 by way of outgoing conveyer 90.

It may also be understood that each of the stations mentioned are pre-existing in the typical assembly line of a number of vehicle manufacturers. The foregoing schematic is for illustrative purposes only, based upon such existing lines, it being well known to those skilled in the art that there are many variations on the basic pattern just set forth. Now that,it has been seen in overview how the preset system of this invention may be incorporated at a C/C/T station within an existing vehicle assembly line, additional details covering various aspects of the invention will be provided.

It will be remembered from the prior discussion with reference to FIG. 1 that C/C/T station 30 has two adjustment bays 32A and 32B. The two bays 32 are identical and simply provide for faster flow-through by parallel processing of the axle subassemblies 14.

Figure 2:
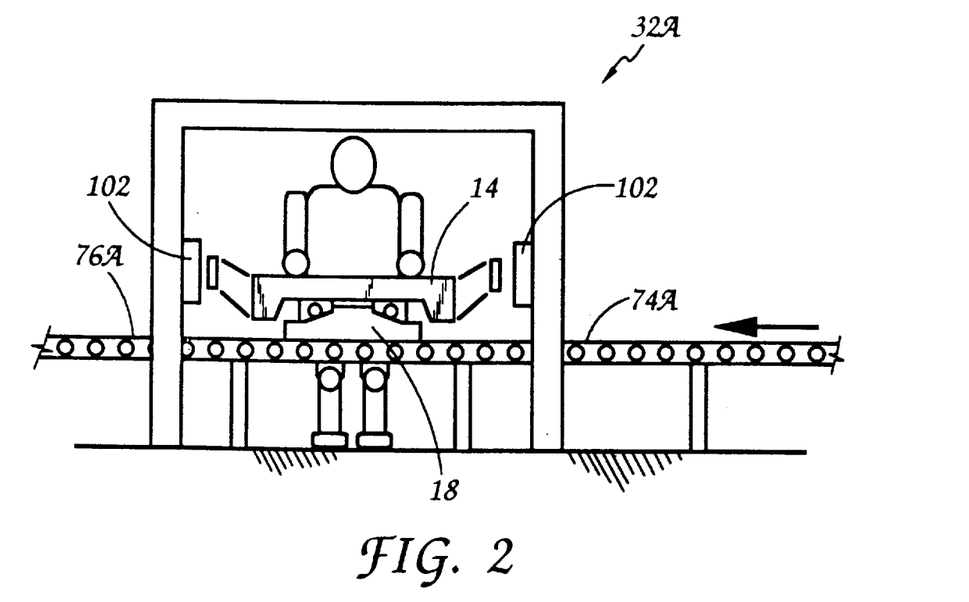
FIG. 2 is a first schematic (front) view of the preset station of FIG. 1.

With reference now to FIG. 2, which is a first schematic view of one adjustment bay 32A, the working of the audit and adjustment bays 32 of the C/C/T station 30 may now be better understood. In FIG. 2, it may be seen that segment 74A of the circulating conveyer 70 brings a platen 18 and subframe 14 into adjustment bay 32A. Within adjustment bay 32A, a number of moving vision units 102, each containing a laser light source and camera, are disposed about the axle subassembly 14.

The preferred orientation of four vision units 102 (separately designated 102A, 102B, 102C and 102D) will be discussed in greater detail with reference to FIGS. 3 and 4. A single moving vision unit 102 will itself be described in more detail with reference to FIG. 5. For now, it is sufficient to note in connection with FIG. 2 that conveyer segment 74B brings a platen 18 with its axle subassembly 14 into adjustment and audit bay 32A where a number of moving vision units 102 are disposed. At this stage, platen 18 is resting on the conveyer for positioning and preloading.

Figure 3:
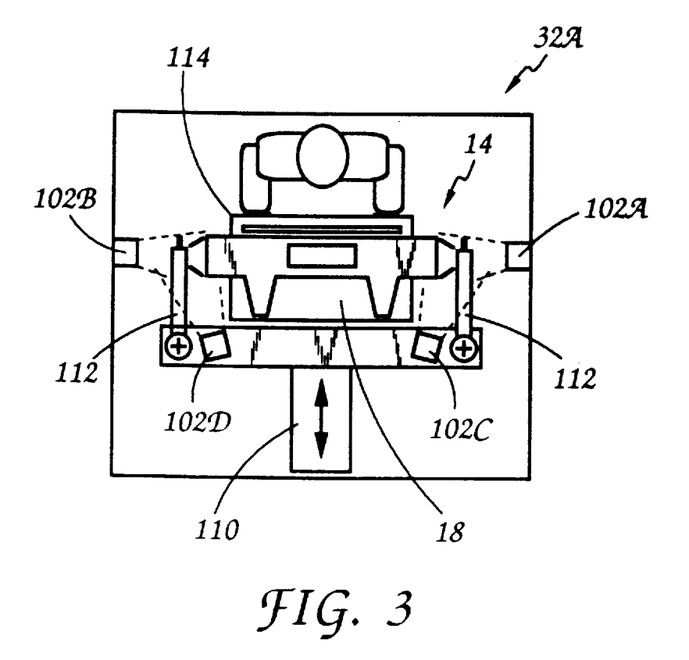
FIG. 3 is a second schematic (top plan) (?) view, of the preset station of FIG. 1.

With reference now to FIG. 3, which is a second schematic view of adjustment bay 32A, it may be seen that platen elevator 110 lifts platen 18 and axle subassembly 14. Load rods 112 preload the axle subassembly 14 so that the audit and adjustment of the axle subassembly will by under the specified load.

It may be seen that there are, in this embodiment of adjustment bay 34A, four separate moving vision units 102, designated 102A, 102B, 102C and 102D. Two moving vision units 102 (designated 102A and 102B) are disposed at the outer periphery of bay 34A so that each of the two units may be aimed at a target which is the outside surface of the wheels/tires carried on axle subassembly 14. That is, vision unit 102A has a field of view on the outside of the left wheel, and vision unit 102B has a field of view on the outside of the right wheel. As a result, each vision unit 102A, 102B has a field of view on the outside surface of one of the target wheels for reading the toe/camber plane of that wheel.

Two other moving vision units 102 (designated 102C and 102D) are disposed within bay 34A so that each of the two units may be aimed at a target which is on the inside surface of wheels/tires carried on axle subassembly 14. That is, vision unit 102C has a field of view on the inside of the left wheel, and vision unit 102D has a field of view on the inside of the right wheel. As a result, each vision unit 102C, 102D has a field of view on the inside surface of one of the target wheels for reading the caster of that wheel, as will be explained in more detail in connection with FIG. 4.

Before leaving FIGS. 1–3, it should be noted that the axle subassembly 14 is positioned on the platen 18 upside down to provide convenient access to all adjustment points. The platen 18 initially rested on the conveyer belt at segment 72 (reference FIG. 1) as it came into axle station 10 for positioning and preloading. At the C/C/T station 30 (reference FIGS. 1 and 3) platen elevator 110 moves toward the platen 18 and, using tapered dowels 106 opposed to mating holes 108, positively engages the platen 18 (with the subframe 14 carried on the platen). The elevator 110 then lifts the platen 18 and subframe/axle subassembly 14 to an operator's working level. At working level, suspension preloading devices (rods 112 with reference to FIG. 3) load the suspension to duplicate its correct ride height. Vision sensor cameras 102 then scan selected points on the subframe and display the data on a monitor (114 with reference to FIG. 3), and the operator makes the necessary adjustments as the cameras 102 continue to display the data.

In summary, and as will now have become clear, in a preferred embodiment as just described, the vision units 102 are disposed in the audit and adjustment bays 32 so that a first vision sensor (for example, vision sensor unit 102A with reference to FIG. 3) reads the toe/camber of a wheel by scanning the outside surface of the wheel, seeing the plane of the wheel in space. A second vision sensor (for example, vision sensor unit 102C with reference to FIG. 3) reads the caster by scanning to the inside of the wheel, seeing the axis of the king pin ball joint. Because the axle subassembly 14 carried on platen 18 has both a left and right wheel, another set of vision sensors (102B and 102D) will read the other wheel in the same way while the axle subassembly 14 is at the audit and adjustment bay 32 of C/C/T station 30.

Figure 4:
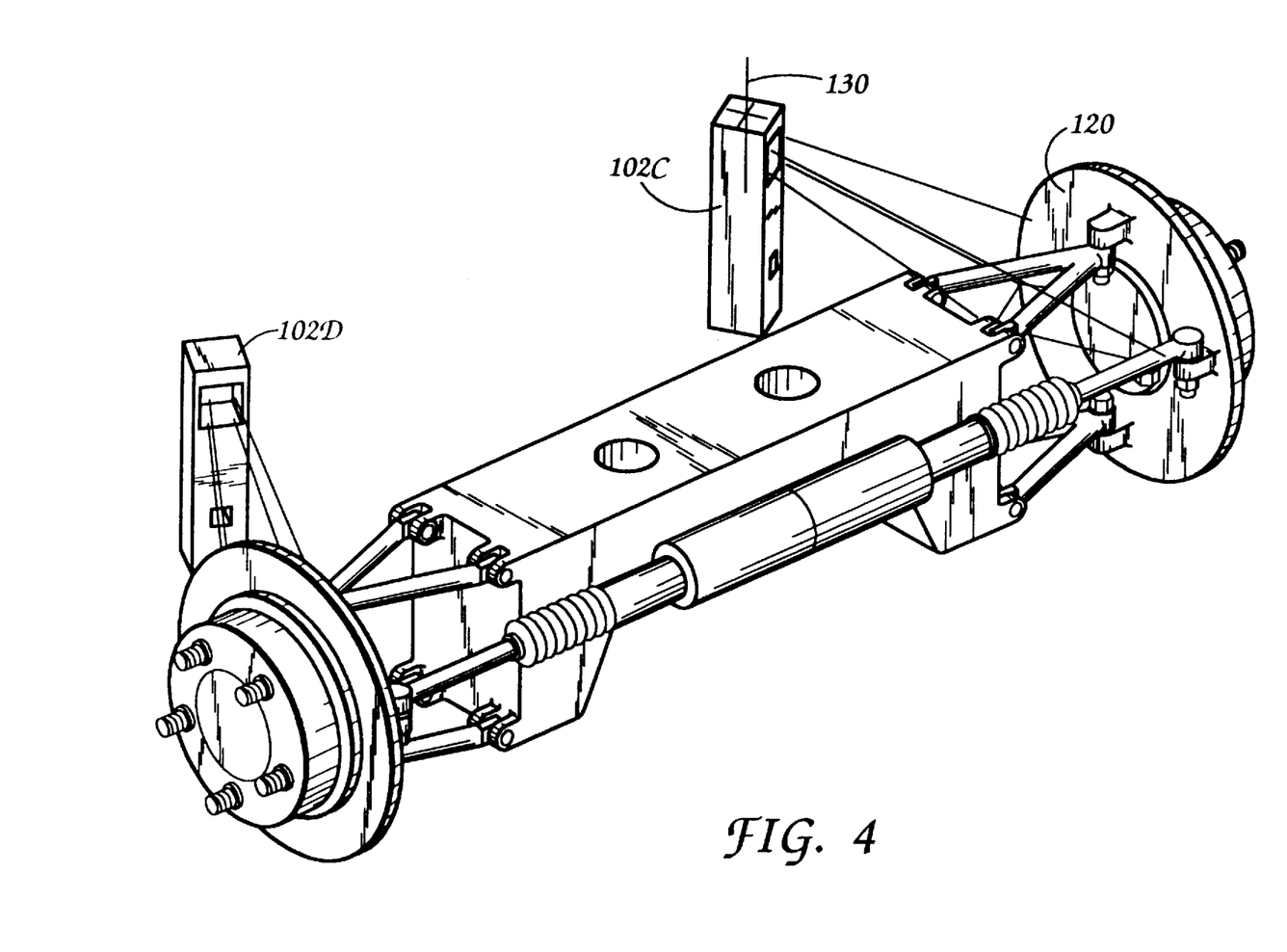
FIG. 4 is a perspective view showing in greater detail the orientation of vision sensors for viewing the inside of the wheel in an axle assembly within the preset station.
Figure 5:
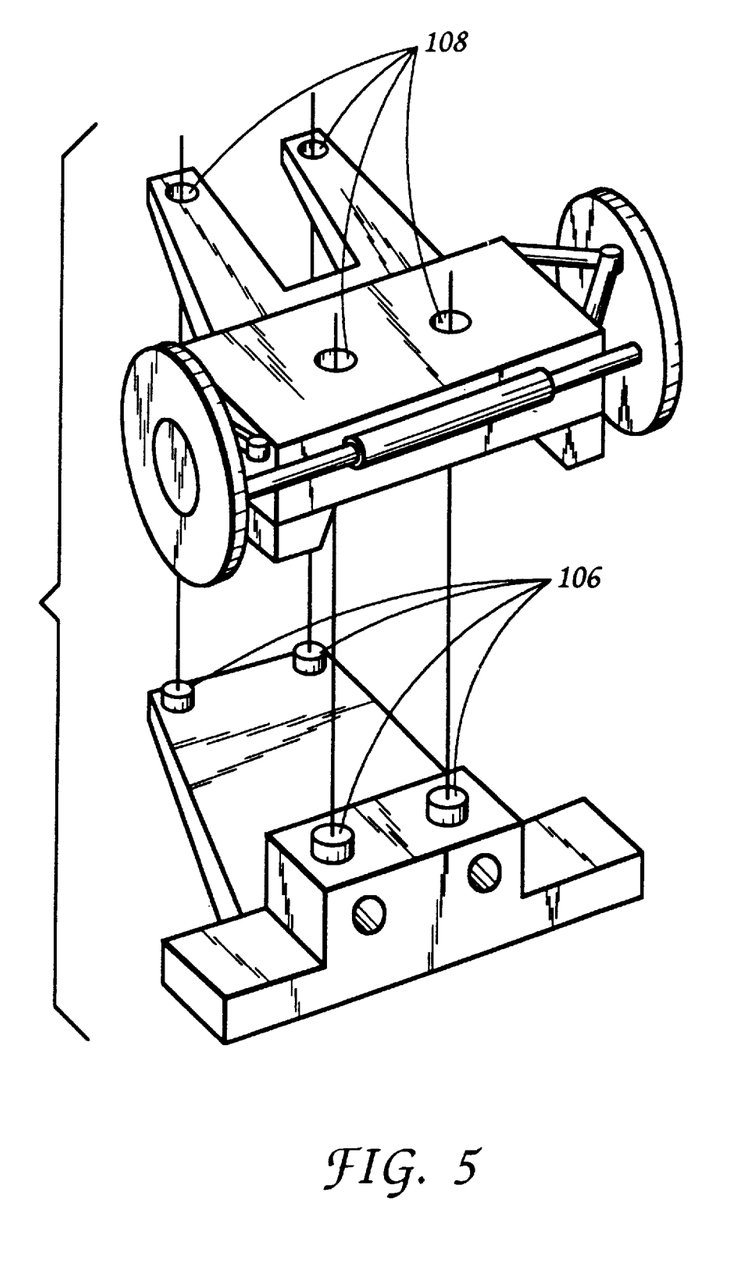
FIG. 5 is an exploded view showing the engagement of the subassembly platen and axle assembly within the preset station of FIG. 1.

Now with reference to FIG. 4, additional details of the orientation of vision units 102C and 102D (reference FIG. 3) for reading the caster from the inside of the wheels can be better understood. Unit 102C is disposed so as to see the inside of the left wheel 120.

Figure 6:
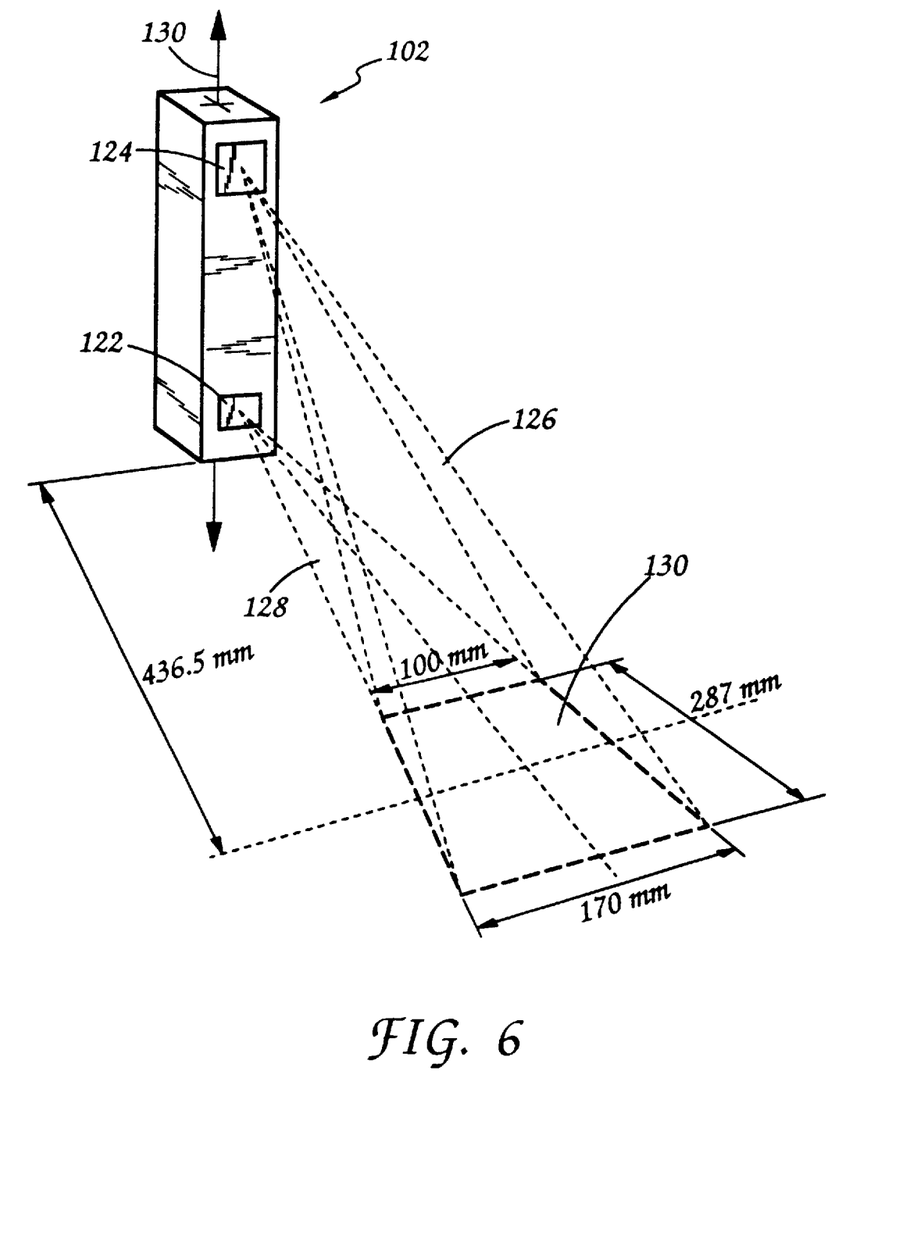
FIG. 6 is a perspective view of a vision system unit of this invention showing the unit's field of view.

Referring now to FIG. 6, it may be seen that each of the vision sensors 102 is mounted in a unit which contains a camera (not shown) having an associated camera window 124, and a laser (not shown) having an associated laser window 122, with their fields of vision triangulated. with reference still to FIG. 6, it may be understood that the camera field of vision (126) and the laser field of vision (128) intersect to describe a field of view (130). The laser and the angled camera see objects within the resulting field of view 130. The laser beam is flat and places a line of light into the field of view 130 which will intersect with any object within the field of view. The camera records the cross sectional line of intersection of the laser beam and the object in the field of view 130.

Such vision units as herein described, including laser/camera transducers for measuring a two-dimensional profile or contour by intersecting a laser line upon a target are readily available from several vendors. For example, the "MDC-250"2-D Contour Sensor available from Medar, Inc. (38700 Grand River Avenue, Farmington Hills, Mich.), which includes a solid state scanner, a CCD photo detector, a modulated infrared laser diode, and a 32-bit microprocessor, can scan a low power laser beam along a linear path to read a contour line on a target from a standoff range of 6 to 30 inches. Vision units such as this have a scan range of 12.5 to 50 mm (0.5 to 2 inches), a resolution of 1:1000 to 1:2000, accuracy of ±0.025 to 0.183 mm (0.001 to 0.032 inches), a data acquisition time of 0.001 seconds or less, and are well suited for application to the apparatus and method of the present invention. Such vision units are known in the art and will not be further described herein.

Still with reference to FIG. 6, it may be understood that the camera/laser transducer is incorporated in vision unit 102, and is moved as a unit. In a preferred embodiment, the laser beam 128 is flat and is oriented in a horizontal plane. Vision unit 102 is first translated vertically along axis 130; then translated a step to the side (shown in phantom on FIG. 6), and then translated vertically along axis 130 again. The camera is pulsed as the sensor unit translates vertically along axis 130, and a series of two dimensional cross sections are obtained which "paint" the object within the field of view.

When the target within the field of view is the outside surface of a wheel, the series of vertical cross sections taken along axis 130 will, as the sensor unit 102 scans up or down the target, produce a topographical sectional map like that seen in FIG. 7 (as previously discussed with reference to FIG. 3, vision unit 102A has such a field of view on the outside surface of the left wheel carried on axle subassembly 14).

Figure 7:
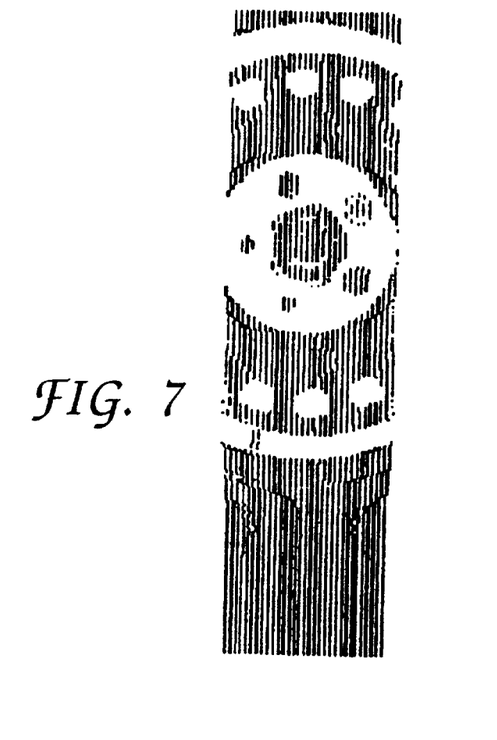
FIG. 7 is a representation of a section of a scan of a tire and wheel taken by a moving vision system unit of this invention.

The topographical sectional map of the wheel/tire as represented in FIG. 7 is fully three dimensional, and is produced by computing the third dimension (known location of the vision unit 102) in relation to the series of contour lines of intersection of the laser beam on the target. A computer rendering adds colors to represent depth. As the vision unit 102 completes each vertical section along axis 130 and then moves to the side for further vertical scans, a complete topographically map the surface volume, shape or contour of the wheel will emerge.

The tire/wheel scan of FIG. 7 generally represents the results of one feasibility experiment. The actual scan represented by FIG. 7 was approximately 100 mm wide and approximately 450 mm long. The depth resolution was about 100 microns unenhanced and 16 colors were used to represent depth. The scan rate was set at 30 scans per second so that the total scan represented by FIG. 7 took about 15 seconds to perform. The vision unit was of the type previously described, available from Medar, Inc. Subsequent to the feasibility experiment, very substantial speed improvements have been made and computer programs have been developed to scan and map the entire wheel in three dimensional space for near real-time audit and adjustment by an operator. The techniques for doing so are well known to those in the field, and once the idea of moving the vision unit 102 is appreciated, the computer applications for mapping the three dimensional volume or surface topography are readily accomplished.

Figure 8:
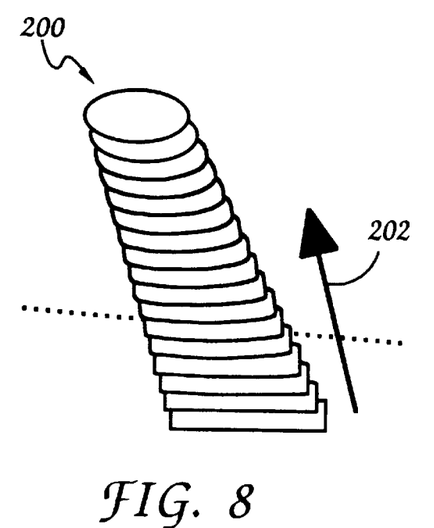
FIGS. 8 and 9 are a diagrammatic representation of the scanned pattern of an object having an axis, as would be taken by a moving a moving vision system unit.
Figure 9:
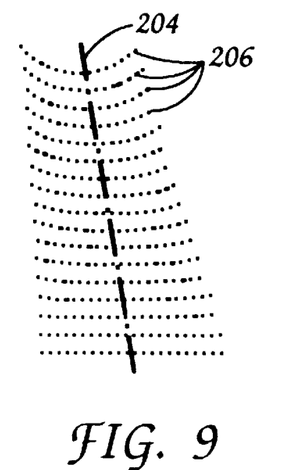

When the target within the field of view is a cylinder or joint, such as the king pin spindle or king pin ball joint which are on the inside of the wheel, then a series of vertical cross sections taken along axis 130 will, as the sensor unit scans up or down the target, produce a topographical sectional map as shown schematically in FIGS. 8 and 9 (as previously discussed with reference to FIGS. 3 and 4, vision unit 102C has such a field of view on the inside of the left wheel carried on axle subassembly 14). FIG. 8 shows diagramatically a generally cylindrical object, broken into cross sections to suggest the pulsed points at which the sensor sees the object 200 as the transducer moves along axis 202. As indicated in FIG. 9, the high point or centroid (seen connected as line 204) between the ends of the image map lines 206 could be used, individually or collectively to form a topographical map of the axis of the object being scanned. This compilation of the axis 204 from a series of cross sectional lines 206 is useful because it can statistically smooth the shape, providing a composite or averaged reading of the axis 204 much more accurately than could be obtained from only a pair of points or intersections. That is, to set the axis of a cylinder, it would be necessary to have at least two points to describe the line of the axis 204. Using a conventional, fixed sensor, this would require two stationary units and would present calibration and accuracy problems. In contrast, using the moving sensor 102 of the present invention, a single sensor gives an accurate reading of the axis 204 because it can scan a number of intersecting lines 206 across the target.

Having now, with reference to FIGS. 6–9, explained the movement of the vision unit 102 as it translates vertically up and down axis 130, and then translates side to side to "paint" a target, and having explained the exemplary results when the target is the surface of a wheel/tire (FIG. 7) or a cylindrical shape (FIGS. 8 and 9), it should be clear, upon returning to a consideration of the adjustment bay 32 of C/C/T station 30 (reference FIGS. 1–4), how the moving vision units 102 of the instant invention work to paint the topographical maps of the points of interest on the axle subassembly 14 on a vehicle assembly line.

With reference to FIG. 3, it may be understood that a pair of moving vision units 102A and 102B paint the topographical map of the left and right wheel/tires, respectively. This gives a completely self-referenced three dimensional location in space of the toe and camber of the wheel/tires of the axle subassembly 14 (which, it will be remembered, is preloaded to the specified load). The operator makes near real-time adjustments of toe and camber within bay 32.

With reference to FIGS. 3 and 4, it may be understood that a pair of moving vision units 102C and 102D paint the topographical map of a target inside the left and right wheel/tires, respectively. This gives a completely self-referenced three dimensional location in space of the king pin reference points (king pin spindle, or king pin joints) of the preloaded axle subassembly 14. The operator makes near real-time adjustments of caster within bay 32.

Finally, the integration of the preset station 30, including its adjustment bays 32 having the moving vision units 102 of this invention into the assembly line process of FIG. 1 having already been explained, only a few more details remain to be discussed.

In the axle receiving station 10, the axle subassemblies 14 are, preferably, inverted to provide convenient access to all adjustment points in a typical subassembly. The axle subassemblies 14 are lifted off the incoming conveyer 80 and placed onto the platens 18 with a hoist 16; at this time the axle subassemblies are rotated 90 degrees depending upon which of the two parallel adjustment bays 32 (that is, 32A or 32B) within the C/C/T station 30 will receive the particular axle subassembly. Within the pre-dress bay 18 of the axle receiving station, the wheel alignment will be set visually to rough tolerance. For example, the toe might be set to within ± two degrees of specification.

Within the C/C/T station 30, a bar code on the axle subassembly 14 is scanned (this process is not separately shown in the drawings because it is conventionally known), and pertinent data available in the bar code is input into the equipment of station 30 in order to select the proper preloading tension so that proper ride height can be set. Of course, this data could be input manually by an operator or, if the line were standardized on a single axle subassembly, this data could be already set. Within one of the adjustment bays 32, the platen elevator 110 automatically raises and clamps the axle subassembly 14 to proper position and height, at the same time clearing the conveyer area and dressing the subassembly to the proper ride height according to the type of suspension.

After installing semi-automatic adjusting tooling on the lower control cam arms, the operator initiates the audit and adjustment cycle by the ordinary safety equipment start up procedure with two palm buttons. The adjustment bay 32 will automatically measure the axle and chassis components as the moving vision sensors 102 scan and measure (as previously described). Calculations are then performed to compute the map of the suspension in space, corrected as necessary using the axle subassembly as a base reference.

The suspension component topographical map is displayed on a monitor screen having full graphic display capabilities for monitoring and diagnostics. Toe is adjusted to get within specification for proper camber and caster evaluation, with automatic tooling continually monitoring and changing the toe as the caster and camber are set within rough specification. The toe is locked into place with the toe locking nuts, and then camber and caster are finally adjusted to final specification. The operator then presses a cycle stop button which records the set data and releases the semi-automatic tooling. This books the data and permits the parking and unloading of the axle subassembly 14. The platen 18 is lowered onto the conveyer 76 and, optionally, a label may be printed or a travel card (build schedule) may be stamped.

The axle subassembly 14 is carried out of the C/C/T station 30 and transferred by conveyer segment 76 to off-loading station 60. The axle subassembly is unloaded with hoist 62 and transported by outgoing conveyer 90 back to the assembly line where it might, for example, be routed to the rear axle marriage station. The empty platen 18 is returned to axle receiving station 10 by conveyer segment 78.

The foregoing assembly line details are given in overview and to complete the disclosure, it being understood that both the general running of such a line, and any number of specific variations are well known within the industry.

The advantages of the system of this invention include speed, accuracy and flexibility in auditing chassis geometry on a preset station 30 on an automobile assembly line. In the detailed description discussed herein, the example was a preset station for vehicle wheel alignment in a typical vehicle assembly line. It should now be understood, however, that the concept of this invention is not narrowly limited to any particular application, and the example is given for purposes of illustration and particular description only.

Accordingly, it can now be understood that this invention provides great advantages in production lines, quality control, and similar applications by moving a vision system relative to a target so as to provide a topographical surface map of the target in space.

What is claimed is:

1. A system for auditing and adjusting the camber, caster and toe of a wheel in a vehicle assembly line, comprising:
   (a) an axle receiving station in communication with the vehicle assembly line for receiving and storing an axle subassembly, the axle subassembly having a left wheel and a right wheel, and each wheel having a king pin assembly,
   (b) a camber, caster, and toe station (C/C/T station) in communication with the axle receiving station for accepting the axle subassembly from the axle receiving station,
   (c) an off-loading station in communication with the C/C/T station for accepting the axle subassembly from the C/C/T station and then returning the axle subassembly to the vehicle assembly line, and
   (d) within the C/C/T station:
      (i) an elevator for raising the axle subassembly to working level,
      (ii) a preloading mechanism to preload the axle subassembly to a specified load,
      (iii) a first moving vision sensor having a field of view exposed to the outside of the left wheel, a first mechanism for moving the field of view of the first vision sensor upon a surface of the outside of the left wheel,
      (iv) a second moving vision sensor having a field of view exposed to the outside of the right wheel, a second mechanism for moving the field of view of the second vision sensor upon a surface of the outside of the right wheel,
      (v) a third moving vision sensor having a field of view exposed to the inside of the left wheel, a third mechanism for moving the field of view of the third vision sensor upon the inside of the left wheel,
      (vi) a fourth moving vision sensor having a field of view exposed to the inside of the right wheel, a fourth mechanism for moving the field of view of the fourth vision sensor upon the inside of the right wheel,
      (vii) a processor for processing and mapping a series of cross sectional views from each of the first, second, third and fourth vision systems to produce a first, second, third a fourth topographical map,
      (viii) an adjustment station for adjusting the toe and camber of the left wheel in response to the first topographical map; adjusting the toe and camber of the right wheel in response to the second topographical map; adjusting the caster of the right wheel in response to the third topographical map; and adjusting the caster of the left wheel in response to the fourth topographical map.

* * * * *